United States Patent
Van Oostrum et al.

(10) Patent No.: US 12,031,898 B2
(45) Date of Patent: Jul. 9, 2024

(54) METHOD FOR DETERMINING A FOCAL LENGTH OF A PARTICLE IN A MEDIUM

(71) Applicant: Universität für Bodenkultur Wien, Vienna (AT)

(72) Inventors: Petrus Dominicus Joannes Van Oostrum, Vienna (AT); Erik Olof Reimhult, Vienna (AT)

(73) Assignee: Universität für Bodenkultur Wien, Vienna (AT)

( * ) Notice: Subject to any disclaimer, the term of this patent is extended or adjusted under 35 U.S.C. 154(b) by 78 days.

(21) Appl. No.: 17/928,106

(22) PCT Filed: Apr. 29, 2021

(86) PCT No.: PCT/EP2021/061322
§ 371 (c)(1),
(2) Date: Nov. 28, 2022

(87) PCT Pub. No.: WO2021/249693
PCT Pub. Date: Dec. 16, 2021

(65) Prior Publication Data
US 2023/0349811 A1 Nov. 2, 2023

(30) Foreign Application Priority Data
Jun. 8, 2020 (EP) .................... 20178801

(51) Int. Cl.
*G01N 15/1433* (2024.01)
*G01B 9/02097* (2022.01)
*G01N 15/1434* (2024.01)

(52) U.S. Cl.
CPC ..... *G01N 15/1433* (2024.01); *G01B 9/02097* (2013.01); *G01N 15/1434* (2013.01); *G01N 2015/1454* (2013.01)

(58) Field of Classification Search
CPC .......... G01N 15/1433; G01N 15/1434; G01N 2015/1454; G01N 15/0227; G01N 2015/0233; G01B 9/02098; G01B 9/02097
See application file for complete search history.

(56) References Cited

U.S. PATENT DOCUMENTS

2017/0309036 A1* 10/2017 Perraut ............... G03H 1/0866
2018/0136114 A1* 5/2018 Delattre ............ G01N 15/1429
(Continued)

FOREIGN PATENT DOCUMENTS

EP 3575773 A1 12/2019

OTHER PUBLICATIONS

Saffmann, M. "Phasen-Doppler-Methode zur Optischen Partikelgrößenmessung/Optical Particle Sizing by Phase-Doppler Anemometry," tm-Technisches Messen, vol. 56, No. 7/8, pp. 298-303 (Jul. 1989). (Machine Translation attached.).
(Continued)

*Primary Examiner* — Michael P LaPage
(74) *Attorney, Agent, or Firm* — Hoffmann and Baron, LLP

(57) ABSTRACT

A method for determining a focal length of a particle in a medium, wherein the method comprises: providing a sample; emitting a coherent light beam to irradiate the sample, wherein a first part of the light beam is scattered by the particle; recording an interference image; computing for a set of positions an electric field from the interference image; generating a representation comprising, for each of said positions, an intensity value of the coherent light beam calculated from the computed electric field; finding two positions, a first of which lies in the sample, a second of (Continued)

which lies in the beam direction behind or in front of said first position; and determining the focal length from the two found positions.

7 Claims, 2 Drawing Sheets

(56) References Cited

U.S. PATENT DOCUMENTS

2020/0319086 A1* 10/2020 Grier ................. G01N 15/1434
2020/0363315 A1* 11/2020 Douet ................ G01N 15/1468
2021/0208048 A1*  7/2021 Akiyama ................. G06T 5/50

OTHER PUBLICATIONS

European Extended Search Report corresponding to Application No. 20178801.5-1001, dated Nov. 2, 2020.
PCT International Search Report corresponding to International Application No. PCT/EP2021/061322, dated Jun. 29, 2021.
PCT International Preliminary Report on Patentability corresponding to International Application No. PCT/EP2021/061322 dated Dec. 13, 2022.

* cited by examiner

METHOD FOR DETERMINING A FOCAL LENGTH OF A PARTICLE IN A MEDIUM

CROSS-REFERENCE TO RELATED APPLICATIONS

This application is a National Phase application of International Application No. PCT/EP2021/061322 filed Apr. 29, 2021 which claims priority to the European Patent Application No. 20 178 801.5 filed Jun. 8, 2020, the disclosures of which are incorporated herein by reference.

TECHNICAL FIELD

The present disclosed subject matter relates to a method for determining a focal length of a transparent particle in a medium.

BACKGROUND

The background of this disclosed subject matter lies in the field of observing colloids such as emulsions, cell cultures and bacteria in a medium, for example to study contamination of water by bacteria or bacterial onset of urinary tract infections. Moreover, plastic particles in ocean water, impurities in liquid foods or pharmaceuticals, cells or their organelles in bodily fluids, or the like could be observed. When a transparent particle is observed that focuses light by scattering, its focal length provides valuable information: The focal length can be correlated with other properties of the particle such as its size, shape, refractive index and, thus, the dry mass, with the amount of water or saccharides in a bacterium, etc., or be used to distinguish classes and subclasses of particles in a medium.

Commonly used methods for determining a particle's optical properties, e.g. its refractive index, are flow cytometry or phase contrast microscopy. Flow cytometry is well-suited to extract statistical information about particles at high throughput. However, it suffers from a low precision in determining a single particle's optical properties and fails in observing particles in a static medium. Phase contrast microscopy, on the other hand, provides a visualisation of individual particles at high precision but only at limited throughput and depth of focus. Moreover, it requires a difficult and demanding interpretation of two-dimensional images to extract the refractive index and, if desired, the focal length of the particle.

Another viable method is digital holographic microscopy. Therein, a sample containing said particle is irradiated with a coherent light beam to obtain an interference image. From the interference image, a three-dimensional model of the irradiating light beam is computed by applying a reconstruction algorithm onto the interference image, e.g., a forward or back propagation or projection algorithm. In the three-dimensional model, the positions of the particle and of its focus, and the focal length as their difference can be determined.

However, experiments have shown that the three-dimensional model obtained by common digital holographic microscopy is often qualitatively unsuited for reliably determining the focal length of particles. On the one hand, the intensity of the light beam at the focus generally exceeds the intensity at the particle by far such that the particle cannot be distinguished from its focus, especially in the case of a small focal length. On the other hand, an inevitable background signal induced by a portion of the light that is scattered in the medium, i.e., not by the particle but by other (usually smaller) bodies in the medium (e.g., by Mie-scattering), is recorded in the interference image. This background signal impairs a contrast between light scattered by the particle and light not scattered by the particle and, hence, deteriorates a determination of its position in the model. To still determine the particle position precisely a tedious and computationally demanding comparison of the reconstructed model with models of scattering, e.g., with Mie theory, would have to be performed.

BRIEF SUMMARY

It is an object of the disclosed subject matter to overcome the limitations of prior art and to provide a method for determining a focal length of a transparent particle in a medium in an efficient and precise manner.

This aim is achieved by a method for determining a focal length of a transparent particle in a medium, comprising:

providing a sample of the medium containing said particle;

emitting, with a light source, a coherent light beam to irradiate the sample, wherein a first part of the light beam is scattered by the particle to create a scattered light beam which has a focus in a beam direction behind or in front of the particle;

recording, with a camera, an interference image of the scattered light beam and a second part of the light beam that has not been scattered by the particle;

computing, with a processor, for each one of a set of positions which are three-dimensionally distributed in a space including the particle and the focus, an electric field of the first part of the light beam from the interference image;

generating, with the processor, a representation of the light beam covering said positions, and comprising, for each of said positions, an intensity value of the coherent light beam calculated from the computed electric field at that position;

finding, with the processor, two positions, a first of which lies in the sample, a second of which lies in the beam direction behind or in front of said first position, and the intensity value for each of which is greater than the respective intensity values for its nearby positions; and determining, with the processor, the focal length from the two found positions;

wherein, in the step of generating, for each position, the intensity value is calculated according to $$I(r, z) = 2 \cdot I_1(r, z) \cdot \left(1 + \cos\left(\Theta + \arctan2\left(\sum_k C_k \cdot \text{Re}(E_1(r, z))^k, \sum_l D_l \cdot \text{Im}(E_1(r, z))^l\right)\right)\right)$$

with r, z being coordinates of the position, wherein z is a coordinate in an opposite direction to the beam direction and r denotes a pair of coordinates in a plane perpendicular to said opposite direction, I(r,z) being the intensity value for the position, $I_1(r,z)$ being an intensity of the first part of the light beam for the position, Θ being a phase shift parameter, k, l being indices of summation, $C_k$, $D_l$ being expansion parameters, $E_1(r,z)$ being the computed electric field for the position, and arctan 2 denoting the four quadrant inverse tangent function.

It shall be noted that the electric field of the light beam is generally complex-valued and, thus, can be described by its real and imaginary parts or by its amplitude and phase. Moreover, the light beam has an intensity, i.e., a power per unit area, which is proportional to the square of the amplitude of the electric field.

The first position corresponds to the particle position and the second position to the focus position such that the focal length can be determined as their difference. Applicants have found out that said calculation of each intensity value allows to achieve a high contrast between light scattered by the particle and light not scattered by the particle and a reliable distinction of the particle from its focus; consequently, said two positions can be precisely found. Thus, the focal length can be efficiently determined directly from the representation rendering a complicated comparison of the intensity or electric field of the light beam with a model of scattering dispensable.

Moreover, the phase shift and expansion parameters used for calculating each intensity value allow for precisely determining the respective focal lengths of a large set of different particles and media. For example, any of the phase shift and expansion parameters can be predetermined, e.g., for a similar sample or measurement, or estimated on the basis of prior knowledge. For instance, the phase shift parameter may be set to π to reduce a background signal. On the other hand, these parameters may be adapted to a particular situation, e.g., to precisely determine the focal length of a specific bacterium in water. To this end, in an embodiment, one or several of the phase shift and expansion parameters can be determined iteratively to optimise the generated representation, e.g., by applying an iterative optimisation algorithm known in the art such as a Quasi-Newton algorithm or the like, which may, e.g., terminate when the particle and focus position are converged.

In a favourable variant of this embodiment, at least one of the phase shift and expansion parameters is determined by repeating the step of generating, wherein said at least one parameter is varied to increase a difference between higher intensity values and lower intensity values comprised by the representation. This optimisation reduces the influence of the background which is typically represented by lower intensity values and results in more pronounced higher intensity values. The difference can, e.g., be a difference between a sum of all higher intensity values and a sum of all lower intensity values, a RMS (root mean square) contrast, etc. For example, employing the latter yields a smaller number of more pronounced intensity value maxima which can be considered first in the step of finding said two positions.

In an alternative or additional variant, at least one of the phase shift and expansion parameters is determined by repeating the steps of generating and finding, wherein said at least one parameter is varied to increase a difference between the intensity value for the first position and the respective intensity values for its nearby positions and/or to increase a difference between the intensity value for the second position and the respective intensity values for its nearby positions. This determination particularly emphasises the respective intensity value for the particle and/or focus position compared to the intensity values for respective nearby positions, such that a local contrast is enhanced.

According to another favourable variant, at least one of the phase shift and expansion parameters is determined by repeating the steps of generating and finding, wherein said at least one parameter is varied to increase a ratio between the intensity value for the first position and the intensity value for the second position. This facilitates a distinction of the intensity value for the particle position from the respective intensity values for the focus position and its nearby positions, which is especially suited for precisely determining small focal lengths.

In an embodiment at least one of the phase shift and expansion parameters is determined by
  a simulation of the steps of providing, emitting, recording, computing and generating to obtain a simulated representation in the step of generating and, for each position covered by the simulated representation, an intensity of a simulated light beam; and
  by repeating the simulation of the step of generating, wherein said at least one parameter is varied to reduce a difference between the intensity values comprised by the simulated representation and the intensities of the simulated light beam at the respective positions.

The medium, additional scatterers in the medium, the particle's surrounding, its shape, size, orientation, refractive index, etc. can be separately simulated and, if necessary, adjusted. Thus, said at least one of the phase shift and expansion parameters can easily be determined either for a particular sample or for a more general case, e.g., by performing a simulation of a sample comprising several particles with different local surroundings. Moreover, this embodiment can, i.a., be used to predetermine at least one of said parameters and/or to set at least one of said parameters to an initial value to be used for iteration according to one of the abovementioned variants.

In another favourable embodiment at least one of the phase shift and expansion parameters depends on the position in the representation. This allows to consider different local vicinities, i.e., nearby positions particularly of the particle position and the focus position, respectively, by predetermining or determining said at least one parameter differently when calculating the intensities values for the respective positions. Thereby, an enhanced precision in determining both the particle and the focus positions and, thus, the focal length can be achieved.

To facilitate a distinction between light scattered by particles and light not scattered by particles, it is advantageous when in the step of finding, only those positions are considered, for which the intensity value is greater than a predetermined threshold. Apart from the easier distinction, this allows for a faster finding of the two positions due to a reduced amount of data to be considered. In this embodiment, the threshold may be predetermined as known to the skilled person, e.g., as a percentage of a (general, typical, expected, or currently determined) maximum intensity value, as an average of intensity values for several positions, as an overall average of all intensity values of the representation, etc.

BRIEF DESCRIPTION OF THE DRAWINGS

The disclosed subject matter shall now be explained in more detail below on the basis of exemplary embodiments thereof with reference to the accompanying drawings, in which.

DETAILED DESCRIPTION

Figure 1:
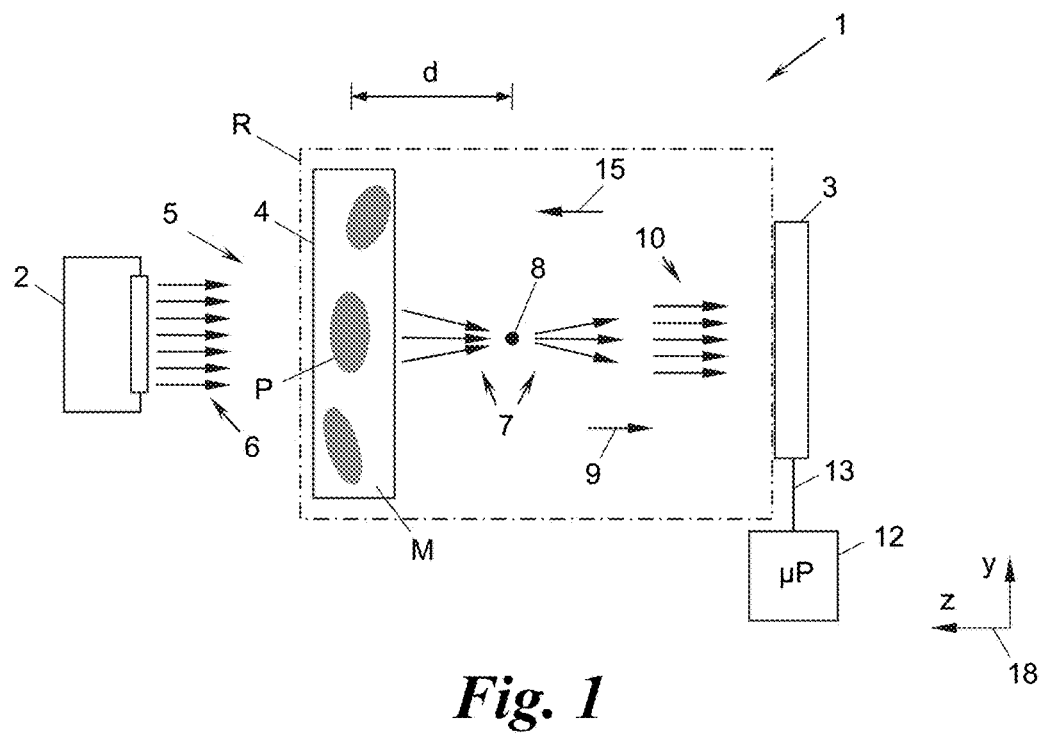
FIG. 1 shows a schematic side view of an inline interferometer used for a method according to the present disclosed subject matter.

FIG. 1 shows an inline interferometer 1 comprising a light source 2 and a camera 3. The inline interferometer 1 is used to determine a focal length d of a (microscopic) transparent particle P in a medium M. For determining the focal length d, a sample 4 of the medium M containing the particle P (or several particles P) is provided in a light path 5 between the light source 2 and the camera 3. Each particle P could be a cell, a bacterium, a charged particle, a micro plastic particle, an organelle, etc., and the medium M could be water, oil, a body fluid (e.g. blood), a solution, or the like. Generally, the focal length d of any transparent particle P focusing light in a medium M may be determined.

To this end, the light source 2 emits a coherent light beam 6 to irradiate the provided sample 4. The light source 2 may be of any type that is capable of emitting a coherent light beam 6, for example a laser diode.

In the sample 4, a first part of the light beam 6 is scattered by the particle P and, thereby, creates a scattered light beam 7 which has a focus 8 that is, in the example of FIG. 1, in a beam direction 9 behind the particle P, namely at a distance therefrom corresponding to the focal length d behind the particle P. In other cases, where the particle P acts as a diverging lens, the focus is in front of the particle P when seen in beam direction 9 (not shown).

However, a second part of the light beam 6 is not scattered by the particle P and traverses the sample 4 as an unscattered light beam 10. In the context of the present description, the scattered light beam 7 relates to scattering by the particle P in the medium M whereas the unscattered light beam 10 has not been scattered by the particle P in the medium M.

The scattered light beam 7 and the unscattered light beam 10 interfere with each other. At the end of the light path 5, the camera 3 records an interference image 11 (FIG. 2) of the scattered light beam 7 and the unscattered light beam 10. The camera 3 can, for the present purpose, be any analogue or digital camera, e.g., with a Complementary Metal-Oxide Semiconductor (CMOS) or a Charge Coupled Device (CCD) image sensor.

It shall be noted, that a portion of both said scattered light beam 7 and said unscattered light beam 10 may, however, also be scattered in the medium M, e.g., by other (usually smaller) bodies (e.g., via the Tyndall Effect), and that this portion of the unscattered light beam 10 slightly deviates from the beam direction 9. In the interference image 11, said portions of the scattered and unscattered light beams 7, 10 result in an inevitable, though undesirable background signal that impairs the determination of the focal length d.

The interferometer 1 may comprise one or more further optical devices as known in the art of holographic microscopy, e.g., an attenuator ring to improve the signal to noise ratio, a microscope objective, a phase plate, one or more lenses, or the like. Moreover, the interferometer 1 can also be embodied as a different type of interferometer than an inline interferometer, for example as an interferometer 1 utilizing beamsplitters.

The interference image 11 recorded by the camera 3 is then forwarded to a processor 12 via an interface 13. Optionally, the processor 12 can preprocess the interference image 11 as known in the art, e.g., to numerically correct for aberrations. Subsequently, the processor 12 processes the interference image 11 to determine the focal length d therefrom as shall now be explained with reference to FIGS. 2 and 3.

While the camera 3 records the interference image 11 as a purely two-dimensional image, this interference image 11 encodes both intensity and phase information of the light beam 6. This information allows the processor 12 to three-dimensionally "reconstruct" the light beam 6.

Figure 3:
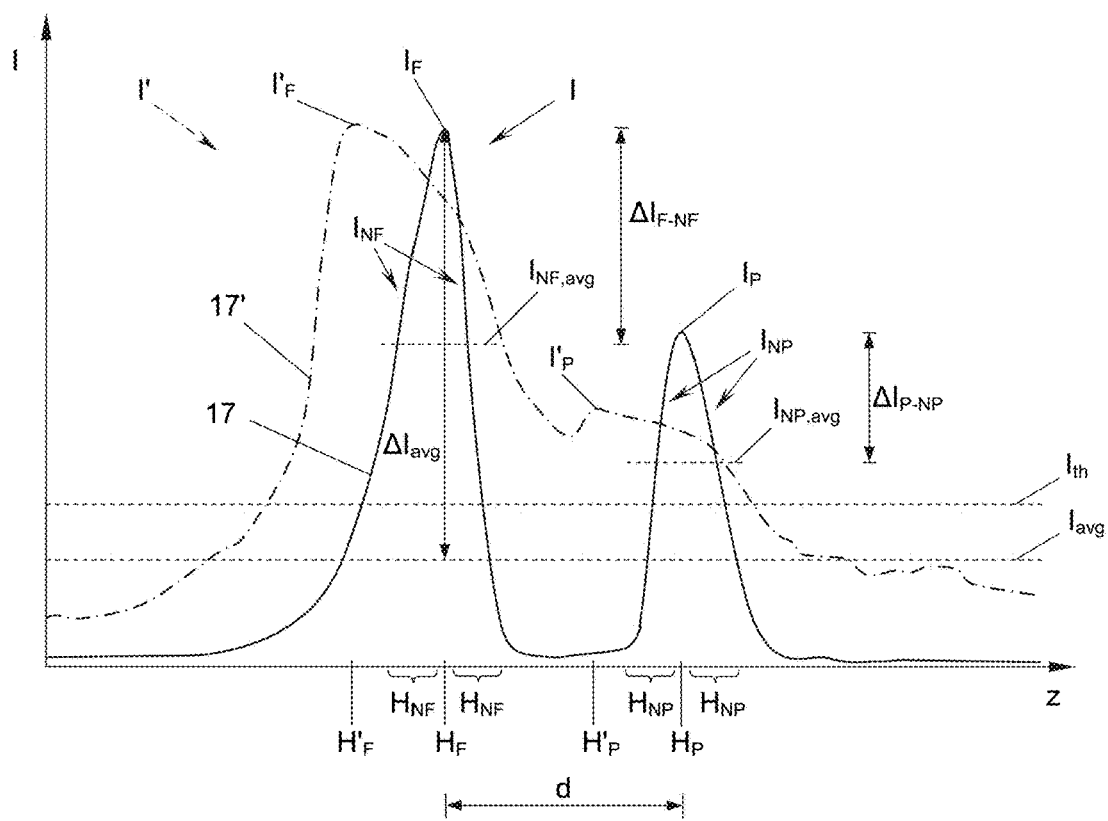
FIG. 3 shows intensity values of a light beam determined according to the method illustrated in FIGS. 1 and 2 as a graph over an opposite direction to a direction of the light beam.
Figure 2:
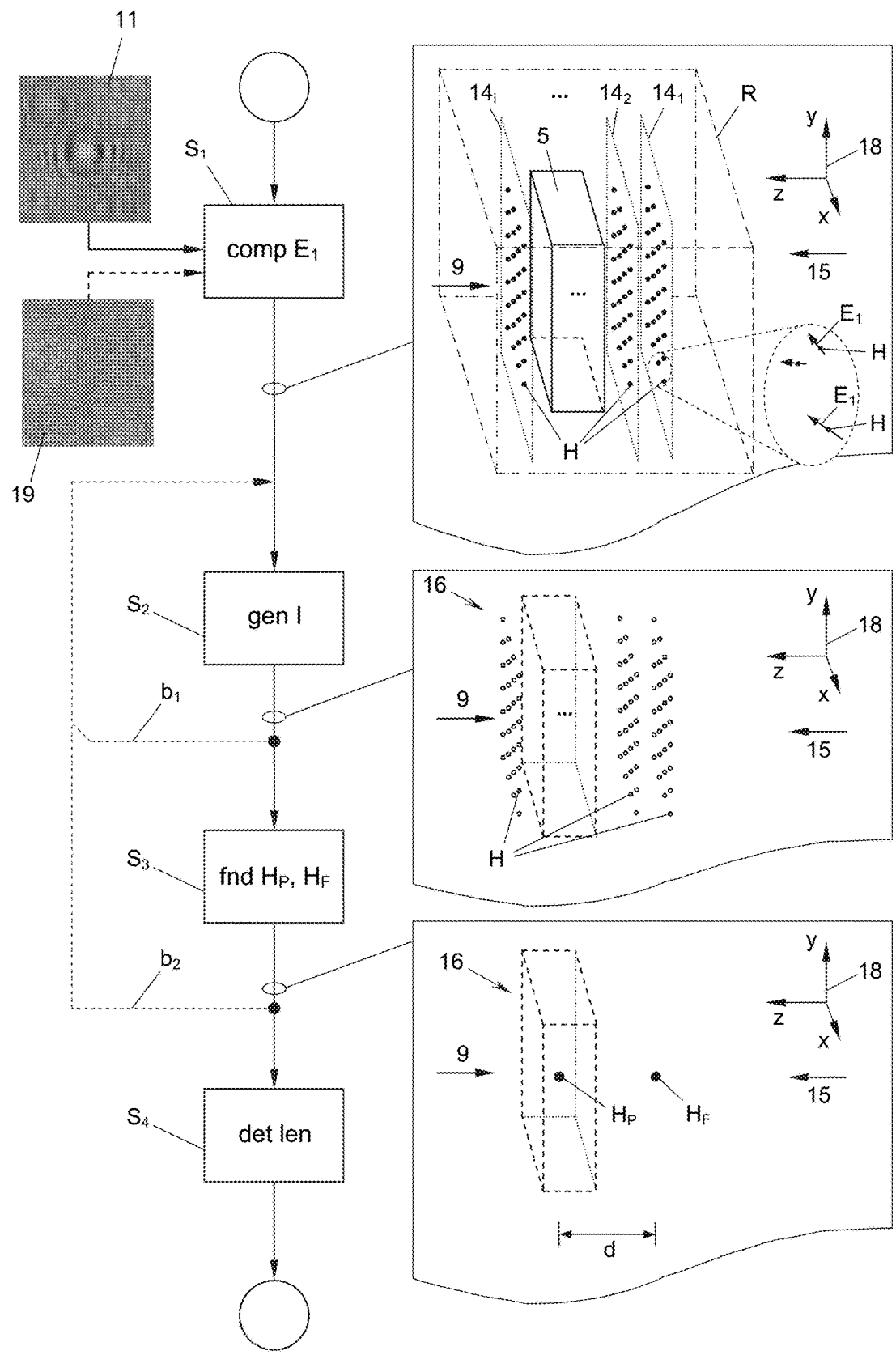
FIG. 2 shows a determination of a focal length according to the disclosed subject matter from an interference image recorded by the interferometer of FIG. 1 in a flow chart.

In a first step $S_1$, the processor 12 computes an electric field $E_1$ of the first part of the light beam 6, i.e., of the scattered light beam 7, for each one of a set of positions H from the interference image 11. The positions H are three-dimensionally distributed in a space R which includes the particle P and the focus 8. In the examples of FIGS. 1 to 3, the space R ranges from within the sample 4 to the camera 3 as the focus 8 is known or expected to be behind the particle P (in beam direction 9). In another embodiment, the space R ranges from within the sample 4 to the light source 2 (or even beyond), when the focus 8 is known or expected to be in front of the particle P (in beam direction 9). In yet another embodiment, the space R ranges, e.g., from the camera 3 to the light source 2 (or beyond).

In the example of FIG. 2, the positions H lie in several virtual planes $14_1$, $14_2$, . . . , generally $14_i$, which are perpendicular to the beam direction 9 of the unscattered light beam 10. In this example, the positions H are identically arranged in each virtual plane $14_i$; however, this is optional. In other examples, the positions H may be distributed differently in the space R, e.g., in a regular grid arrangement representing adjoining cubic regions or in an irregular grid arrangement representing adjacent arbitrarily formed spatial regions.

To compute the electric field $E_1$ of the scattered light beam 7, for each position H in the set, the processor 12 applies a reconstruction algorithm onto the interference image 11. The electric field $E_1$ of the scattered light beam 7 for each position H is complex-valued and, thus, its real and imaginary parts or its phase $\varphi_1$ and amplitude, respectively, are computed. In the present example, the processor 12 applies the reconstruction algorithm plane by plane in a direction 15 which is opposite to the beam direction 9. However, this is optional. Thus, multiple variants of reconstruction algorithms may be applied as known in the art, for example forward or back propagation or projection algorithms, e.g., an inverse Radon transformation, a Fourier-domain reconstruction algorithm, an iterative reconstruction algorithm, etc.

In a subsequent second step $S_2$, the processor 12 generates a representation 16 of the sample 4 which covers all positions H and comprises, for each position H, a respective intensity value I (FIG. 3) which represents an intensity of the light beam 6 at that position H. From the electric field $E_1$ and an intensity $I_1$ of the scattered light beam 7 computed for that position H, e.g., as a square of the amplitude of the electric field $E_1$, the intensity value I for each position H is calculated according to $$I(r, z) = 2 \cdot I_1(r, z) \cdot \left(1 + \cos\left(\Theta + \arctan2\left(\sum_{k \in K} C_k \cdot \mathrm{Re}(E_1(r, z))^k, \sum_{l \in L} D_l \cdot \mathrm{Im}(E_1(r, z))^l\right)\right)\right)$$

with
r, z being coordinates of the position H, wherein z is a coordinate in an opposite direction 15 to the beam direction 9 and r denotes a pair of coordinates in a plane x, y perpendicular to said opposite direction 15, I(r,z) being the intensity value for the position H, $I_1$(r,z) being the intensity of the first part of the light beam 6 for the position H, Θ being a phase shift parameter which has either been predetermined or is determined as will be shown below, k, l being indices of summation which are iterated over a set K, L of values, respectively, $C_k$, $D_l$ being expansion parameters, which have either been predetermined or are determined as will shown below, $E_1$(r,z) being the computed electric field for the position H, and arctan 2 denoting the four quadrant inverse tangent function.

It shall be understood that the summations exclude the trivial cases of all expansion parameters $C_k$, $D_l$ being zero and of arctan 2 solely yielding the phase $\varphi_1$ of the electric field $E_1$ of the scattered light beam 7. Moreover, the indices of summation k, l do not have to be restricted to integer numbers, i.e., each of the sets K, L could, e.g., include real valued numbers as well.

In a third step $S_3$ subsequent to step $S_2$, the processor 12 finds two positions $H_P$, $H_F$: a first position $H_P$ which is the particle position and lies in the sample 4, and a second position $H_F$ which is the focus position and lies behind (or in other cases: in front of) the particle position $H_P$ when seen in beam direction 9, i.e., either within the sample 4 or between the sample 4 and the camera 3 (in said other cases: either within the sample 4 or between the sample 4 and the light source 2 or even beyond). The two positions $H_P$ and $H_F$ are found according to the following criterion: For each of these two positions $H_P$, $H_F$ the respective intensity value $I_P$, $I_F$ is a local maximum, i.e., each intensity value $I_P$, $I_F$ is greater than the respective intensity values $I_{NP}$, $I_{NF}$ for nearby positions $H_{NP}$, $H_{NF}$ (FIG. 3). The nearby positions $H_{NP}$ are the positions H located in a vicinity, e.g., a sphere or box, around the particle position $H_P$. This applies correspondingly to the nearby positions $H_{NF}$ of the focus position $H_F$.

To find the two positions $H_P$, $H_F$ the processor 12 may apply any finding algorithm; e.g., it may first determine all intensity values I which show a local maximum and then compare the respective positions H in order to find the two positions $H_P$, $H_F$ which are distanced from each other in beam direction 9. If several pairs of first and second positions $H_P$, $H_F$ fulfil this selection criterion, either several particles P are present in the sample 4 (FIG. 1); otherwise, an additional selection criterion may optionally be used, e.g., taking the position H with the highest intensity value I as the focus position $H_F$, or taking the position H with a distribution of intensity values I therearound showing a known particle scattering distribution (e.g., a distribution derived from Mie scattering theory) as the particle position $H_P$, etc.

In a final step S4, the processor 12 determines the focal length d of the particle P in the medium M from the two positions $H_P$, $H_F$ found in step $S_3$, e.g., as their mutual distance calculated from their respective coordinates x, y, z in a given coordinate system 18 (FIG. 3).

Various embodiments of calculating the intensity values I in step $S_2$ shall now be explained with respect to FIG. 3.

The exemplary graph of FIG. 3 shows intensity values I which have been calculated along the direction 15 and which are represented by a solid line 17. In a first embodiment, at least one of the phase shift and expansion parameters Θ, $C_k$, $D_l$, i.e., the phase shift parameter Θ, one or more of the first expansion parameters $C_k$ and/or one or more of the second expansion parameters $D_l$ is predetermined, e.g., for a similar sample or measurement, or determined on the basis of prior knowledge. For example, the phase shift parameter Θ may be set to π, which generally reduces the background signal.

In an alternative or additional embodiment, at least one of the phase shift and expansion parameters Θ, $C_k$, $D_l$ is iteratively determined for the recorded interference image 11 of the sample 4.

In a first variant thereof, step $S_2$ is iteratively repeated (dashed branch $b_1$ in FIG. 2) and said at least one parameter Θ, $C_k$, $D_l$ is varied in each iteration to increase a difference between higher intensity values I and lower intensity values I comprised by the representation 16. Said higher intensity values I may, for example, be higher than an average intensity value $I_{avg}$, higher than an intensity threshold $I_{th}$, e.g., a certain percentage of a highest intensity value I (here: $I_F$), or may be a fixed number of (e.g.: ten) local maxima of the calculated intensity values I comprised by the representation 16, etc. Similarly, said lower intensity values I may be lower than the abovementioned (or a different) intensity threshold $I_th$, said average intensity value $I_{avg}$, etc.

In this example, the difference between higher and lower intensity values I is computed as a sum of absolute deviations $\Delta I_{avg}$ between each intensity value I and the average intensity value $I_{avg}$, such that the variance of all intensity values I comprised by the representation 16 is increased. Alternatively, other differences may be employed, e.g., a difference between a sum of all higher and a sum of all lower intensity values I, etc.

In the example of FIG. 3, the result of the iterative determination of said at least one parameter Θ, $C_k$, $D_l$ is symbolised by the solid line 17, whereas a dashed line 17' symbolises initial intensity values I', i.e., intensity values calculated prior to repeating step $S_2$. As shown in this example, the solid line 17 has more pronounced maxima $I_P$, $I_F$ than the dashed line 17' which, besides, shows maxima in the intensity values $I'_P$, $I'_F$ at different particle and focus positions $H'_P$, $H'_F$.

It shall be noted, that FIG. 3 depicts intensity values I in direction 15, i.e., in z-direction, while the variation of said at least one parameter Θ, $C_k$, $D_l$ generally affects the representation 16 in all three dimensions. It is further noted that the determination of the expansion parameters $C_k$, $D_l$ includes a determination of the respective set K, L, i.e., the sets K, L may be predetermined and the expansion parameters $C_k$, $D_l$ be iteratively determined, or the sets K, L may be determined iteratively as well.

In a second variant, the steps $S_2$ and $S_3$ are repeated (dashed branch $b_2$ in FIG. 2), and said at least one parameter Θ, $C_k$, $D_l$ is varied to increase a difference $\Delta I_{P-NP}$ between the intensity value $I_P$ for the particle position $H_P$ and the respective intensity values $I_{NP}$ for its nearby positions $H_{NP}$, wherein the intensity values $I_{NP}$ of said nearby positions $H_{NP}$ are optionally averaged to an average intensity value $I_{NP,avg}$. Alternatively, a difference between the intensity value $I_P$ and any other combination of nearby intensity values $I_{NP}$ may be employed, e.g., a weighted sum of the intensity values $I_{NP}$. Similarly, said at least one parameter Θ, $C_k$, $D_l$ is additionally or alternatively varied to increase a difference $\Delta I_{F-NF}$ between the intensity value $I_F$ for the focus position $H_F$ and the respective intensity values $I_{NF}$ for nearby positions $H_{NF}$ of the focus position $H_F$, e.g., their average $I_{NF,avg}$.

In a third variant, the steps $S_2$ and $S_3$ are repeated, wherein said at least one parameter Θ, $C_k$, $D_l$ is varied to increase a ratio between the intensity value $I_P$ for the particle position $H_P$ and the intensity value $I_F$ for the focus position $H_F$.

In a further additional or alternative embodiment, the processor 12 simulates a light beam irradiating a sample, its scattering and its intensities recorded in an interference image. This simulation may be performed as known in the art, e.g., using a field tracing method, either for an assumed particular sample or for a more general sample, each sample containing one or more particles. From this simulated interference image, the intensity values I are calculated for a further set of positions, which are different or equal to the set of positions H, by performing the steps $S_1$ and $S_2$ as illustrated above to obtain a simulated representation. Thus, the steps of providing, recording, emitting, computing and generating are simulated. Then, a repeated simulation of step $S_2$ of generating is performed, wherein said at least one parameter $\Theta$, $C_k$, $D_l$ is varied to reduce a difference between the intensity values comprised by the simulated representation and the intensities of the simulated light beam at the respective positions. Of course, the simulations may optionally be performed for different particles in different media, and the resulting parameters $\Theta$, $C_k$, $D_l$ may be combined, e.g., averaged, to be applicable to a wide variety of particles P and media M.

Optionally, at least one of the phase shift and expansion parameters $\Theta$, $C_k$, $D_l$ depends on the position H in the representation 16 such that the intensity values I for different positions H are calculated using different values of said at least one parameter $\Theta$, $C_k$, $D_l$. For example, a value of said at least one parameter $\Theta$, $C_k$, $D_l$, e.g., $C_2$, may be predetermined or determined for the particle position $H_P$ and its nearby positions $H_{NP}$ to be different from the value of the same at least one parameter $\Theta$, $C_k$, $D_l$ for the focus position $H_F$ and its nearby positions $H_{NF}$.

Any of the abovementioned embodiments and variants may be performed using optimisation algorithms with stopping criteria known in the art, e.g., a Quasi-Newton algorithm which stops when the particle and focus positions $H_P$, $H_F$ are converged.

Moreover, the abovementioned embodiments and variants may be combined while optimising a different one or different ones of said parameters $\Theta$, $C_k$, $D_l$, respectively.

In an optional embodiment, the intensity threshold $I_{th}$ is introduced prior to the processor's step $S_3$. Thereupon, the positions H for which the determined intensity value I is smaller than the calculated intensity threshold $I_{th}$ shall not be considered and used in step $S_3$. The intensity threshold $I_{th}$ may, e.g., be estimated, or be a percentage of a maximum intensity value I ($I_F$ in FIG. 3), a running average, an average of two or more, or even of all intensity values I comprised in the representation 16.

In a further optional embodiment, a reference image 19 of the coherent light beam 6 which has not been scattered by the particle P, thus relating to the unscattered light beam 10, is generated. Based thereupon, the processor 12 may normalise the interference image 11 prior to said step $S_1$ of computing as known in the art, such that a normalised computed electric field $E_1$ is computed in step $S_1$ and used as the electric field $E_1$ in subsequent step $S_2$.

It goes without saying, that the present method may be performed using multiple light beams at different frequencies and/or multiple light sources, e.g., to study the focal length from different illuminating angles and/or a dispersion of the particle P. Moreover, in addition to the focal length d, the intensities $I_P$, $I_F$ at the particle and focus positions $H_P$, $H_F$ may be used as well, e.g., to characterise or discriminate the particle P from other particles in the sample 4.

The disclosed subject matter is not restricted to the specific embodiments described above but encompasses all variants, modifications and combinations thereof that fall within the scope of the appended claims.

What is claimed is:

1. A method for determining a focal length of a transparent particle in a medium, comprising:
   providing a sample of the medium containing said particle;
   emitting, with a light source, a coherent light beam to irradiate the sample, wherein a first part of the light beam is scattered by the particle to create a scattered light beam which has a focus in a beam direction behind or in front of the particle;
   recording, with a camera, an interference image of the scattered light beam and a second part of the light beam that has not been scattered by the particle-;
   computing, with a processor, for each one of a set of positions which are three-dimensionally distributed in a space including the particle and the focus, an electric field of the first part of the light beam from the interference image;
   generating, with the processor, a representation of the light beam covering said positions, and comprising, for each of said positions, an intensity value of the coherent light beam calculated from the computed electric field at that position;
   finding, with the processor, two positions, a first of which lies in the sample, a second of which lies in the beam direction behind or in front of said first position, and the intensity value for each of which positions is greater than the respective intensity values for nearby positions; and
   determining, with the processor, the focal length from the two found positions;
   wherein, in the step of generating, for each position, the intensity value is calculated according to $$I(r,z) = 2 \cdot I_1(r,z) \cdot \left(1 + \cos\left(\Theta + \arctan2\left(\sum_k C_k \cdot \mathrm{Re}(E_1(r,z))^k, \sum_l D_l \cdot \mathrm{Im}(E_1(r,z))^l\right)\right)\right)$$

with
   r, z being coordinates of the position, wherein z is a coordinate in an opposite direction to the beam direction and r denotes a pair of coordinates in a plane x, y perpendicular to said opposite direction,
   I(r,z) being the intensity value for the position,
   $I_1$(r,z) being an intensity of the first part of the light beam for the position,
   $\Theta$ being a phase shift parameter,
   k, l being indices of summation,
   $C_k$, $D_l$ being expansion parameters,
   $E_1$(r,z) being the computed electric field for the position, and
   arctan 2 denoting a four quadrant inverse tangent function.

2. The method according to claim 1, wherein at least one of the phase shift and/or expansion parameters is determined by repeating the step of generating, wherein said at least one of the parameters is varied to increase a difference between higher intensity values and lower intensity values comprised by the representation.

3. The method according to claim 1, wherein at least one of the phase shift and/or expansion parameters is determined by repeating the steps of generating and finding, wherein said at least one of the parameters is varied to increase a difference between the intensity value for the first position and the respective intensity values for nearby positions and/or to increase a difference between the intensity value for the second position and the respective intensity values for nearby positions.

4. The method according to claim 1, wherein at least one of the phase shift and/or expansion parameters is determined by repeating the steps of generating and finding, wherein said at least one of the parameters is varied to increase a ratio between the intensity value for the first position and the intensity value for the second position.

5. The method according to claim 1, wherein at least one of the phase shift and/or expansion parameters is determined by
- a simulation of the steps of providing, emitting, recording, computing and generating to obtain a simulated representation in the step of generating and, for each position covered by the simulated representation, an intensity of a simulated light beam; and
- by repeating the simulation of the step of generating, wherein said at least one of the parameters is varied to reduce a difference between the intensity values comprised by the simulated representation and the intensities of the simulated light beam at the respective positions.

6. The method according to claim 1, wherein
at least one of the phase shift and/or expansion parameters depends on the position in the representation.

7. The method according to claim 1, wherein, in the step of finding, only those positions are considered, for which the intensity value is greater than a predetermined threshold.

\* \* \* \* \*